US012757048B2

(12) United States Patent
Wang et al.

(10) Patent No.: US 12,757,048 B2
(45) Date of Patent: Oct. 6, 2026

(54) METHOD AND APPARATUS FOR OBTAINING AND SENDING PHYSICAL LAYER MEASUREMENT DATA

(71) Applicant: Lenovo (Beijing) Limited, Beijing (CN)

(72) Inventors: Jianfeng Wang, Beijing (CN); Jing Han, Beijing (CN); Haipeng Lei, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 480 days.

(21) Appl. No.: 18/309,601

(22) Filed: Apr. 28, 2023

(65) Prior Publication Data

US 2023/0308926 A1 Sep. 28, 2023

Related U.S. Application Data

(63) Continuation of application No. PCT/CN2023/072071, filed on Jan. 13, 2023.

(30) Foreign Application Priority Data

Jan. 19, 2022 (CN) ........................ 202210059720.X

(51) Int. Cl.
*H04W 24/10* (2009.01)

(52) U.S. Cl.
CPC .................................. *H04W 24/10* (2013.01)

(58) Field of Classification Search
CPC ..... H04W 24/10; H04L 5/0048; H04B 17/309
See application file for complete search history.

(56) References Cited

U.S. PATENT DOCUMENTS 8,014,311 B2 * 9/2011 Lindoff ................ H04B 17/382 370/252
8,335,192 B2 * 12/2012 Mahajan ............... H04W 76/10 709/227
8,897,788 B2 * 11/2014 Ruuska ................. H04W 48/16 370/332
9,294,883 B2 * 3/2016 Kneckt ................... H04W 4/06
9,749,075 B2 * 8/2017 Liao ...................... H04L 5/0007
2016/0302230 A1 * 10/2016 Novlan ................ H04J 11/0023
2019/0081714 A1 * 3/2019 Xiang .................. H04B 17/318
2019/0386720 A1 * 12/2019 Qian ........................ H04B 7/06

(Continued)

*Primary Examiner* — Un C Cho

(74) *Attorney, Agent, or Firm* — ANOVA LAW GROUP, PLLC

(57) ABSTRACT

A method for obtaining physical layer measurement data being applied to a management node in a wireless short-distance communication system includes: sending a measurement request frame including physical layer measurement configuration information, the physical layer measurement configuration information being included in one or both of physical layer control information and physical layer data information of the measurement request frame, and the physical layer measurement configuration information including an identifier of at least one target managed node; and obtaining a measurement frame returned by the at least one target managed node, the measurement frame including a pilot symbol for physical layer measurement, and the pilot symbol is included in the physical layer data information of the measurement frame.

20 Claims, 6 Drawing Sheets

(56) References Cited

U.S. PATENT DOCUMENTS

| | | | | |
|---|---|---|---|---|
| 2020/0067577 | A1* | 2/2020 | Lou | H04B 7/0617 |
| 2022/0337304 | A1* | 10/2022 | Qiao | H04W 74/0833 |
| 2023/0362705 | A1* | 11/2023 | Trainin | H04W 24/02 |
| 2025/0063410 | A1* | 2/2025 | Tao | H04W 8/24 |

* cited by examiner

METHOD AND APPARATUS FOR OBTAINING AND SENDING PHYSICAL LAYER MEASUREMENT DATA

CROSS-REFERENCE TO RELATED APPLICATION

This application is a continuation of International Application No. PCT/CN2023/072071, filed on Jan. 13, 2023, which claims priority to Chinese Patent Application No. 202210059720.X, filed with the China National Intellectual Property Administration (CNIPA) on Jan. 19, 2022, the entire contents of all of which are incorporated herein by reference.

TECHNICAL FIELD

The present disclosure relates to the technical field of communications and, more particularly, to a method and an apparatus for obtaining and sending physical layer measurement data.

BACKGROUND

Wireless short-distance communication technology is able to provide wireless transmission to meet the needs of various short-distance services, and has the advantages of consuming relatively less power.

In the current wireless short-distance communication technology, pilot symbols corresponding to physical layer measurement are inserted into physical layer data information of wireless frames. If there is no data interaction between two electronic devices based on the wireless short-distance communication technology, the physical layer measurement cannot be achieved between the two electronic devices.

SUMMARY

One aspect of the present disclosure provides a method for obtaining physical layer measurement data being applied to a management node in a wireless short-distance communication system The method includes: sending a measurement request frame including physical layer measurement configuration information, the physical layer measurement configuration information being included in one or both of physical layer control information and physical layer data information of the measurement request frame, and the physical layer measurement configuration information including an identifier of at least one target managed node; and obtaining a measurement frame returned by the at least one target managed node, the measurement frame including a pilot symbol for physical layer measurement, and the pilot symbol is included in the physical layer data information of the measurement frame.

Another aspect of the present disclosure provides a method for sending physical layer measurement data being applied to a managed node in a wireless short-distance communication system. The method includes: receiving a measurement request frame including physical layer measurement configuration information, the physical layer measurement configuration information being included in one or both of physical layer control information and physical layer data information of the measurement request frame, and the physical layer measurement configuration information including a managed node identifier and a measurement request node identifier used to indicate a management node that sends the measurement request frame; and sending a measurement frame including a pilot symbol for physical layer measurement, the pilot symbol is included in the physical layer data information of the measurement frame, and the physical layer control information of the measurement frame includes the measurement request node identifier used to indicate the management node that requests for the pilot symbol.

Another aspect of the present disclosure provides an apparatus for obtaining physical layer measurement data being applied to a management node in a wireless short-distance communication system. The apparatus includes a memory storing program instructions and a processor configured to execute the program instructions to perform: sending a measurement request frame including physical layer measurement configuration information, the physical layer measurement configuration information being included in one or both of physical layer control information and physical layer data information of the measurement request frame, and the physical layer measurement configuration information including an identifier of at least one target managed node; and obtaining a measurement frame returned by the at least one target managed node, the measurement frame including a pilot symbol for physical layer measurement, and the pilot symbol is included in the physical layer data information of the measurement frame.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

The terms "first", "second", "third", "fourth", etc., if any, in the specification, the claims, and the drawings are used to distinguish similar parts and not necessarily to describe specific orders or sequences. It should be understood that the data so used are interchangeable under appropriate circumstances such that the embodiments of the present disclosure described herein can be practiced in sequences other than those illustrated herein.

DETAILED DESCRIPTION OF THE EMBODIMENTS

Embodiments of the present disclosure can be applied to a wireless short-distance communication system. When there is no data interaction between a management node and a managed node of the wireless short-distance communication system, the management node is still enabled to obtain information required for physical layer measurement and hence perform the physical layer measurement.

The wireless short-distance communication system may be a communication system based on any wireless short-distance communication technology. The wireless short-distance communication system may have many possibilities. For example, it may be a wireless short-distance communication system supporting low-power communication technology or other types of wireless short-distance communication systems, and the present disclosure is not limited thereto.

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

The nodes in the wireless short-distance communication system of the present disclosure may include a management node and at least one managed node. A wireless network connection is established between the management node and the at least one managed node. The management node is connected to the at least one managed node to complete a specific communication function, and the management node and the at least one connected managed node together form a communication domain.

For ease of understanding, the present disclosure will be described first from the management node side.

Figure 1:
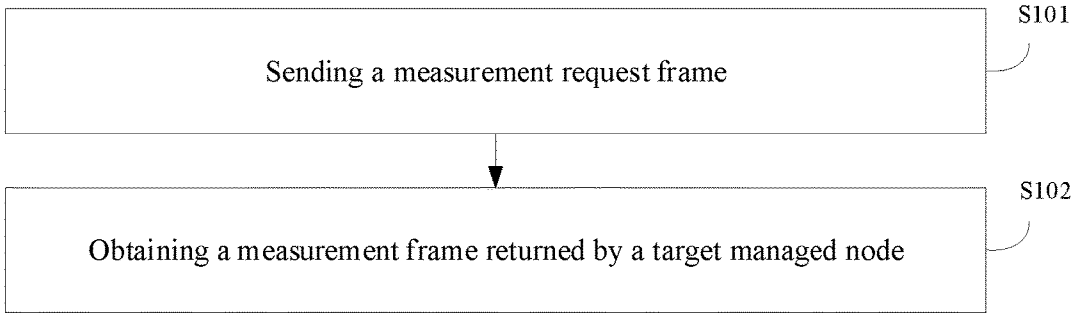
FIG. 1 is a flowchart of an exemplary method for obtaining physical layer measurement data according to some embodiments of the present disclosure.

FIG. 1 is a flowchart of an exemplary method for obtaining physical layer measurement data according to some embodiments of the present disclosure. The method may be applied to the management node in the wireless short-distance communication system. As shown in FIG. 1, the method includes the following processes.

At S101, a measurement request frame is sent.

The measurement request frame includes physical layer measurement configuration information. The physical layer measurement configuration information may be configured to indicate configuration information related to physical layer measurement.

In some embodiments, the physical layer measurement configuration information at least includes an identifier of at least one target managed node. The at least one target managed node is a managed node determined by the management node that needs to provide data required by the management node to perform the physical layer measurement. Thus, the at least one target managed node is at least one managed node connected to the management node.

It should be understood that the physical layer measurement may be any measurement related to channel estimation. For example, the physical layer measurement includes related measurement items such as channel quality, ranging, angle, and perception, which are not limited in the present disclosure.

According to different measurement objectives (or measurement requirements) of the physical layer measurement, the specific content included in the physical layer measurement configuration information may also be different.

In some embodiments, for example, the physical layer measurement configuration information may include some or all of the following items: a measurement request frame identifier used to instruct a target managed node to start sending a pilot symbol, a measurement request node identifier used to indicate the management node that sends the measurement request frame, a requested node identifier used to indicate the target managed node for sending the pilot symbol, a to-be-measured wireless channel code used to indicate a wireless channel that needs to be measured at the physical layer, and a pilot symbol format indicator used to indicate transmission format information of the pilot symbol.

The measurement request frame identifier is used to indicate that the frame type to which the measurement request frame belongs is a wireless frame for requesting the pilot symbol.

In some embodiments, the measurement request node identifier is an identifier of the management node. The requested node identifier is an identifier of the target managed node, and may include identifiers of one or more requested nodes.

The pilot symbol format indicator may include relevant information for indicating a specific type and format of the pilot symbol, and a transmission mode, etc. For example, the pilot symbol format indicator may include information such as a sequence generation coefficient and a length of the pilot symbol, a transmission time of the pilot symbol, and a transmission power of the pilot symbol.

In practical applications, other physical layer measurement information and other related control information may also be configured in physical layer control information (e.g., physical layer measurement configuration information) of the measurement request frame as required. The present disclosure is not limited thereto.

In some embodiments, the physical layer measurement configuration information is configured in one or both of the physical layer control information and physical layer data information in the measurement request frame.

For example, the physical layer measurement configuration information may be configured in the physical layer control information or in the physical layer data information of the measurement request frame.

As another example, a part of the content of the physical layer measurement configuration information may be configured in the physical layer control information, and the remaining part of the content may be configured in the physical layer data information. For example, in the physical layer measurement configuration information, the measurement request node identifier, the requested node identifier, and the measurement request frame identifier are configured in the physical layer control information, and the pilot symbol format indicator and other information are configured in the physical layer data information.

In some embodiments, a frame structure of the measurement request frame may have many variations, and the frame structure of the measurement request frame at least includes the physical layer control information and the physical layer data information.

In some embodiments, the frame structure of the measurement request frame may sequentially include four parts: a preamble, a synchronization signal, the physical layer control information, and the physical layer data information. In addition, the physical layer measurement configuration information may be configured in at least one or both of the physical layer control information and the physical layer data information in the measurement request frame.

Figure 2:
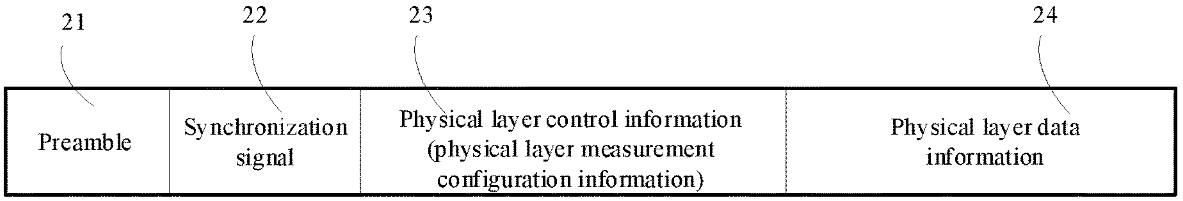
FIG. 2 is a schematic diagram of an exemplary measurement request frame according to some embodiments of the present disclosure.
Figure 3:
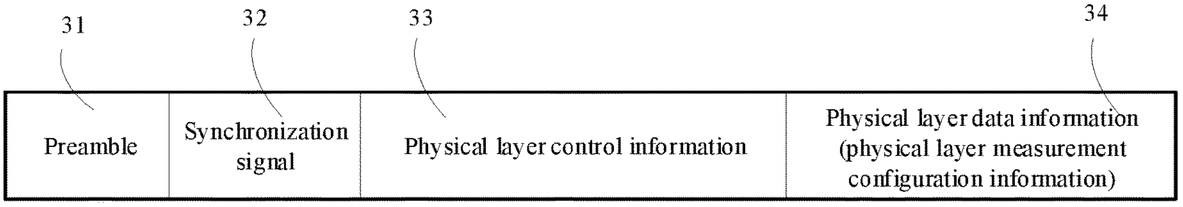
FIG. 3 is a schematic diagram of another exemplary measurement request frame according to some embodiments of the present disclosure.

FIG. 2 is a schematic diagram of an exemplary measurement request frame according to some embodiments of the present disclosure. FIG. 3 is a schematic diagram of another exemplary measurement request frame according to some embodiments of the present disclosure. As shown in FIG. 2, the frame structure of the measurement request frame includes four parts: a preamble 21, a synchronization signal 22, physical layer control information 23, and physical layer data information 24. The physical layer control information 23 includes the physical layer measurement configuration information. The measurement request frame in this format instructs the target managed node to send a measurement signal in time, such that the management node can perform the physical layer measurement such as channel quality measurement in real time. In this case, no data may be carried in the physical layer data information. Or some data may also be carried as required, and the present disclosure is not limited thereto.

As shown in FIG. 3, the frame structure of the measurement request frame includes including a preamble 31, a synchronization signal 32, physical layer control information 33, and physical layer data information 34. The physical layer measurement configuration information is included in the physical layer data information 34 of the measurement request frame. In this case, the physical layer measurement configuration information may be defined in advance by high layers such as a basic service layer in the protocol architecture of the wireless short-distance communication system, indicating that the physical layer data information in the measurement request frame is used to carry the physical layer measurement configuration information. Because the physical layer measurement configuration information is included in the physical layer data information, in this case, the measurement request frame may be sent as a normal data packet.

At S102, a measurement frame returned by the target managed node is obtained.

The measurement frame includes the pilot symbol used for the physical layer measurement.

It should be understood that, during a channel transmission process of the pilot symbol, due to channel noise interference and other factors, there may be a difference between the pilot symbol sent by the target managed node and the pilot symbol received by the management node. However, because the pilot symbol is sent by the management node instructing the target managed node, the management node knows the pilot symbol actually sent by the target managed node. As such, the management node combines the pilot symbol actually sent by the target managed node and the pilot symbol actually received by the management node for channel estimation and other operations, and the physical layer measurement is performed. The present disclosure does not impose any limitation on the processing related to the physical layer measurement performed by the management node based on the pilot symbol.

In some embodiments, the pilot symbol may be included in the physical layer data information of the measurement frame.

In some embodiments, the frame structure of the measurement frame includes at least the physical layer data information.

It should be understood that, in order for the management node to determine that the destination node of the measurement frame is itself, the measurement frame may also include the measurement request node identifier, which is used to indicate the management node that requests the pilot symbol. Thus, the measurement request node identifier is also the identifier of the management node.

In some embodiments, the frame structure of the measurement frame may also include the physical layer control information. Thus, the measurement request node identifier can be included in the physical layer control information.

It should be understood that the physical layer control information of the measurement frame may also include other information, which is not limited.

In some embodiments, the physical layer control information of the measurement frame may include some or all of the following information: the measurement frame identifier used to instruct the management node to start receiving the pilot symbol, the measurement request node identifier used to indicate the management node requesting the pilot symbol, a sending node identifier used to indicate the target managed node that sends the measurement frame, the pilot symbol format indicator used to indicate the transmission format information of the pilot symbol. The measurement frame identifier is used to indicate that the measurement frame is the wireless frame required for the physical layer measurement. In some embodiments, the measurement request node identifier is also the identifier of the management node that initiates the physical layer measurement. The sending node identifier is also the identifier of the target managed node that sends the measurement frame.

The pilot symbol format indicator in the measurement frame may include information such as the transmission format used by the target managed node to actually send the pilot symbol. For example, the pilot symbol format indicator in the measurement frame may include the sequence generation coefficient and the length of the pilot symbol, the transmission power of the pilot symbol, and the like.

It should be understood that the relevant format and transmission requirements in the pilot symbol format indicator in the measurement request frame include information such as the format and transmission mode of the pilot symbol that the management node expects the managed node to send. The pilot symbol format indicator in the measurement frame includes information such as the relevant transmission format of the pilot symbol actually sent by the target managed node.

In practical applications, if the target managed node transmits the pilot symbol according to the transmission format required by the pilot symbol format indicator in the measurement request frame sent by the management node, the pilot symbol format indicator in the measurement frame may not contain the information such as the transmission format of the pilot symbol.

In some embodiments, the frame structure of the measurement frame may also have multiple variations. For example, the frame structure of the measurement frame may sequentially include: a preamble, a synchronization signal, physical layer control information, and physical layer data information.

Figure 4:
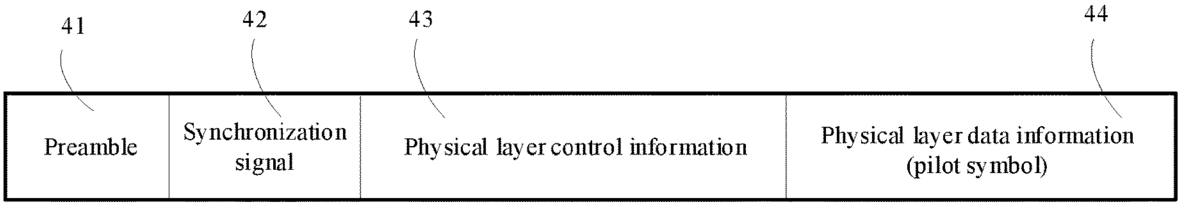
FIG. 4 is a schematic diagram of an exemplary measurement frame according to some embodiments of the present disclosure.

FIG. 4 is a schematic diagram of an exemplary measurement frame according to some embodiments of the present disclosure. As shown in FIG. 4, the frame structure of the measurement frame sequentially includes a preamble 41, a synchronization signal 42, physical layer control information 43, and physical layer data information 44.

The pilot symbol may be included in the physical layer data information 44.

The measurement frame identifier, the measurement request node identifier, the pilot symbol format indicator, and other information may be included in the physical layer control information.

In some embodiments, the measurement frame is used to send the pilot symbol required for the physical layer measurement, and the pilot symbol is included in the physical layer data information of the measurement frame. Because the pilot symbol in the physical layer measurement information is different from the data carried in the conventional wireless frame, a cyclic check bit may not be carried in the physical layer data information of the measurement frame.

In some embodiments, the format of the pilot symbol may have many variations. Different formats may be adopted according to different physical layer measurement requirements.

For example, the pilot symbol may have the following form variations. In some embodiments, the pilot symbol may be an m-sequence (longest linear shift register sequence) that may be used for channel state information measurement, signal strength measurement, channel reception quality measurement and, so on.

In some other embodiments, the pilot symbol may be a Gold sequence, which is a pseudo-random sequence proposed and analyzed based on the m-sequence and with better characteristics. The Gold sequence pilot symbol may be used for channel state information measurement, signal strength measurement, channel reception quality measurement, and so on.

In some other embodiments, the pilot symbol may be a Zadoff-Chu (ZC) sequence that may be used for physical layer related measurements such as perception, ranging, positioning, direction, and measurement.

In the embodiments of the present disclosure, the measurement request frame sent by the management node in the wireless short-distance communication system includes the physical layer measurement configuration information. The physical layer measurement configuration information includes the identifier of the target managed node that needs to perform the physical layer measurement. Correspondingly, the target managed node may return a measurement frame to the management node, and the physical layer data information in the measurement frame includes the pilot symbol for the physical layer measurement. In some embodiments, the management node may instruct the target managed node to return the measurement frame carrying the pilot symbol through the measurement request frame, without resorting to the wireless frame used to transmit data between the physical layers. Thus, even if there is no data interaction between the management node and the managed nodes, and data for the physical layer measurement may also be obtained through the measurement request frame and the measurement frame.

In the embodiments of the present disclosure, the management node may send the measurement request frame in the form of multiple variations.

In some embodiments, the management node may send the measurement request frame in the form of unicast. In this case, only one target managed node identifier is configured in the physical layer measurement configuration information in the measurement request frame sent by the management node, and the measurement request frame and the corresponding measurement frame are transmitted between the management node and the target managed node in a point-to-point manner.

Figure 5:
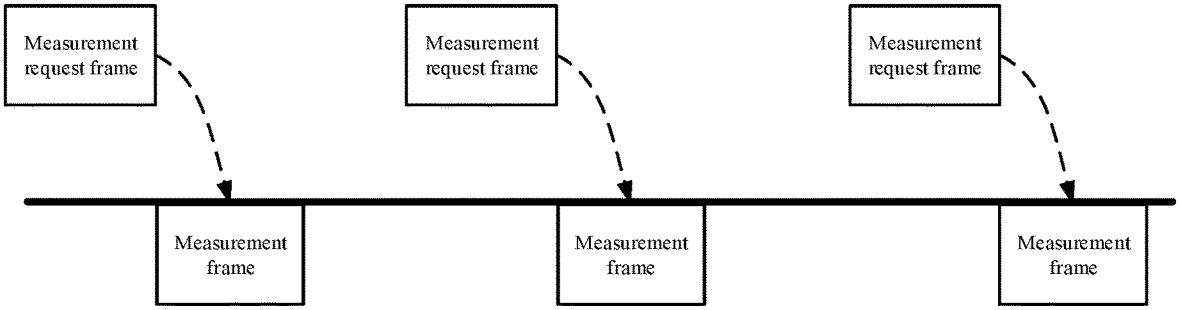
FIG. 5 is a schematic diagram of a mapping relationship between a measurement request frame and a measurement frame when a management node sends the measurement request frame in the form of unicast according to some embodiments of the present disclosure.

FIG. 5 is a schematic diagram of a mapping relationship between a measurement request frame and a measurement frame when a management node sends the measurement request frame in the form of unicast according to some embodiments of the present disclosure. As shown in FIG. 5, the measurement request frame sent by the management node in the unicast mode and the measurement frame received by the target managed node have a certain mapping relationship. In the scenario that the measurement request frame is sent in the form of unicast, after the management node sends the measurement request frame, the target managed node receives the measurement request frame and is triggered to generate and return the corresponding measurement frame.

In some other embodiments, the management node may send the measurement request frame in the form of multicast. Correspondingly, the physical layer measurement configuration information in the measurement request frame may include identifiers of multiple target managed nodes. In this case, the management node communicates with multiple target managed nodes and requests all target managed nodes to return the corresponding measurement frames.

It should be understood that since multiple target management nodes will return the corresponding measurement frames to the management node, in order to ensure that the management node reliably receives the corresponding measurement frame returned by each target managed node, the management node requires different target managed nodes send the measurement frame thereof at different times.

In addition, the management node may set pilot symbol sending times corresponding to identifiers of the multiple target managed nodes in the pilot symbol format indicator in the measurement request frame. After the management node sends the measurement request frame, the target managed node may send the pilot symbol to the management node at the pilot symbol sending time corresponding to the identifier of the target management node in the measurement request frame.

Figure 6:
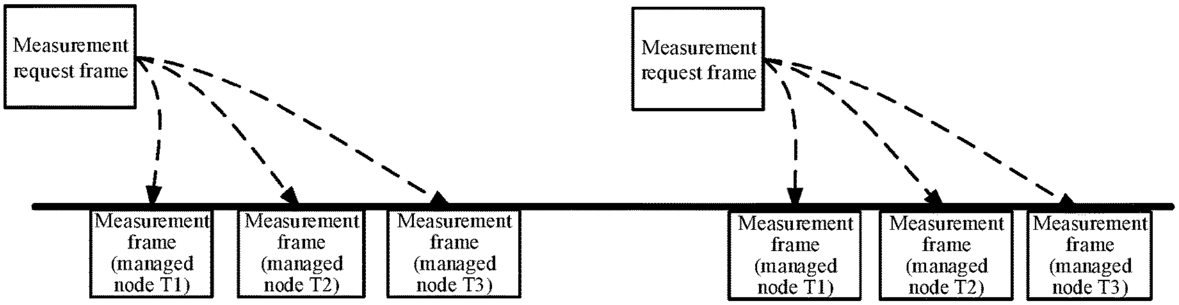
FIG. 6 is a schematic diagram of a mapping relationship between a measurement request frame and a measurement frame when a management node sends the measurement request frame in the form of multicast according to some embodiments of the present disclosure.

FIG. 6 is a schematic diagram of a mapping relationship between a measurement request frame and a measurement frame when a management node sends the measurement request frame in the form of multicast according to some embodiments of the present disclosure. As shown in FIG. 6, the measurement request frame and the measurement frames sent by each target managed node have a certain mapping relationship when the management node sends the measurement request frame in the form of multicast.

As shown in FIG. 6, a plurality of target managed nodes including a target managed node T1, a target managed node T2, and a target managed node T3 are examples for illustration.

As shown in FIG. 6, a positional sequence of the measurement frames on a straight line is used to characterize a sequence of the sending times of the measurement frames.

As shown in FIG. 6, after the management node sends the measurement request frame in the form of multicast each time, the three target managed nodes return the measurement frames to the management node at different times.

It should be understood that by configuring the pilot symbol sending times corresponding to different target managed nodes in the pilot symbol format indicator in the measurement request frame, different time resources may be used to facilitate orthogonal multiplexing among resources.

In practical applications, the pilot symbol sending times may also be pre-determined based on the basic service layer in the protocol architecture of the wireless short-distance communication system through signaling. The present disclosure is not limited thereto.

When the measurement request frame is sent in the form of unicast, the management node may also configure the pilot symbol sending times in the pilot symbol format indicator in the measurement request frame. The present disclosure is not limited thereto.

In the embodiments of the present disclosure, according to the actual needs of the physical layer measurement, the management node may also configure each target managed node to send the measurement frames thereof in multiple frequency bands (also called frequency points), such that the management node can receive the measurement frames returned by the target managed nodes in multiple different frequency bands. In order to achieve this objective, the management node may set wireless channel codes corresponding to multiple to-be-measured frequency bands in to-be-measured wireless channel codes of the physical layer measurement configuration information in the measurement request frame.

Further, the management node may also set in the pilot symbol format indicator of the physical layer measurement configuration information: the pilot symbol sending times at which the target managed nodes respectively send the pilot symbols on the multiple frequency bands.

Figure 7:
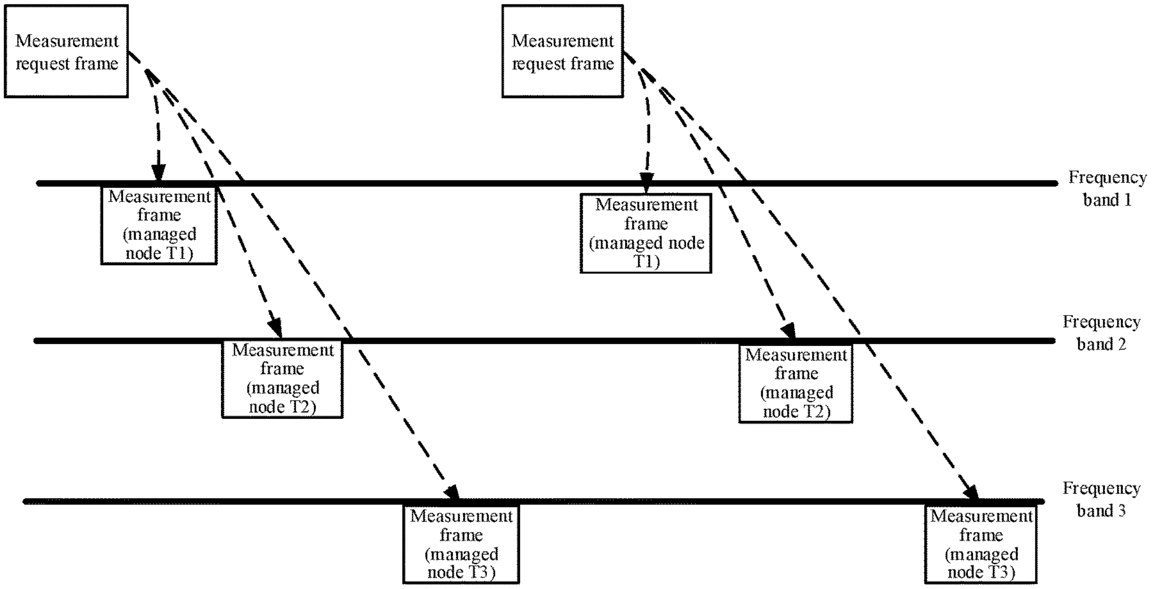
FIG. 7 is a schematic diagram of a mapping relationship between a measurement request frame and a measurement frame when a management node uses multiple frequency bands to perform physical layer measurement according to some embodiments of the present disclosure.

For ease of understanding, in the case of performing physical layer measurement in multiple frequency bands, the corresponding relationship between the measurement request frame sent by the management node and the measurement frame returned by the target managed node can be referred to FIG. 7.

As shown in FIG. 7, after the management node sends the measurement request frame, the target managed node (such as the T1, T2, and T3 nodes in FIG. 7) respectively return the measurement frames on the multiple frequency bands.

Moreover, the target managed nodes send the measurement frames thereof in different frequency bands at different times. As shown in FIG. 7, the sequence of the measurement frames from left to right represents the sending times of the measurement frames. The target managed nodes return the measurement frames in channels of different frequency bands at different times, such that the management node can respectively receive the measurement frames returned by the target managed nodes in different frequency bands at different times, thereby ensuring the management node to reliably receive the measurement frames in different frequency bands.

For ease of understanding the operation of the target managed node side, the embodiments of the present disclosure will be described below from the perspective of the target managed node.

Figure 8:
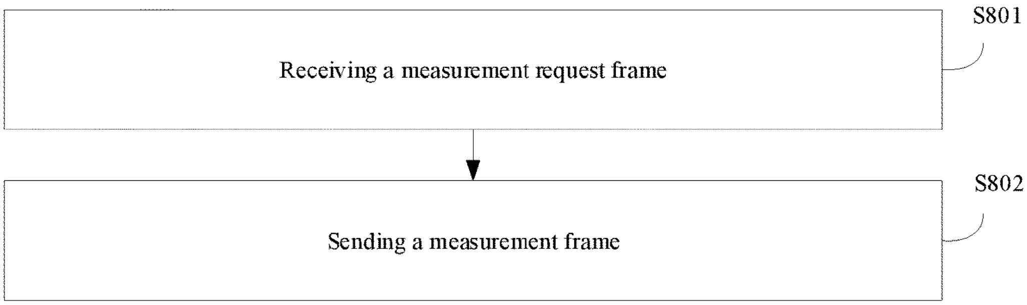
FIG. 8 is a flowchart of an exemplary method for sending physical layer measurement data according to some embodiments of the present disclosure.

FIG. 8 is a flowchart of an exemplary method for sending physical layer measurement data according to some embodiments of the present disclosure. The method may be applied to the managed node in the wireless short-distance communication system. As shown in FIG. 8, the method may include the following processes.

At S801, a measurement request frame is received.

The measurement request frame includes the physical layer measurement configuration information. The physical layer measurement configuration information may be included in one or both of the physical layer control information and the physical layer data information in the measurement request frame.

In some embodiments, the physical layer measurement configuration information includes the identifier of the managed node and the identifier of the measurement request node. The identifier of the measurement request node is used to indicate the management node that sends the measurement request frame.

The identifier of the managed node is the identifier of the requested node configured in the physical layer measurement configuration information. Correspondingly, the managed node that receives the measurement request frame is the target managed node. In some embodiments, for the specific content of the frame structure of the measurement request frame and the included physical layer measurement configuration information, reference can be made to the relevant previous descriptions, and details thereof are omitted herein.

At S802, a measurement frame is sent.

The measurement frame includes the pilot symbol for the physical layer measurement. The pilot symbol is included in the physical layer data information of the measurement frame. The physical layer control information of the measurement frame includes the measurement request node identifier. The measurement request node identifier is used to indicate the management node requesting the pilot symbol.

It should be understood that, for the specific structure and composition of the measurement frame, reference can be made to the relevant previous descriptions, and details thereof are omitted herein.

In some embodiments, if the pilot symbol sending time corresponding to the identifier of the target managed node is included in the pilot symbol format indicator of the physical layer measurement configuration information in the measurement request frame, the target managed node may send the measurement frame when its corresponding pilot symbol sending time is reached.

In some other embodiments, if the physical layer measurement configuration information in the measurement request frame includes the wireless channel codes corresponding to the multiple to-be-measured frequency bands, and the pilot symbol format indicator includes the pilot symbol sending times in the multiple frequency bands corresponding to the respective target managed nodes, for each frequency band in the multiple frequency bands, the target managed node transmits the pilot symbol in the frequency band when the corresponding pilot symbol sending time is reached.

It should be understood that after receiving the measurement request frame, the managed node returns the measurement frame containing the pilot symbol to the management node, such that the management node can perform the physical layer measurement based on the received pilot symbol. Thus, the physical Layer measurement may not be limited by whether there is data interaction between the management node and the managed node.

In some embodiments, the management node may determine the physical layer measurement requirements based on requirements of a measurement management function module in the basic service layer in the configured wireless short-distance communication protocol. On this basis, in combination with the physical layer measurement requirements, the management node can configure corresponding physical layer measurement configuration information in the measurement request frame.

In some embodiments, before sending the measurement request frame, the management node may also determine at least one target managed node for performing physical layer measurement from at least one managed node connected to the management node.

After the management node determines one or more targets of the physical layer measurement, the management node may query about at least one target managed node capable of measuring the physical layer. The management node may query the physical layer measurement capability of each target managed node based on a connection management function unit in the wireless short-distance communication protocol to determine at least one target managed node with the physical layer measurement capability.

For example, based on the connection management function unit, the management node can query whether each managed node has the ability to facilitate the corresponding physical layer measurement through broadcasting and other forms. On this basis, combined with query results returned by each managed node, the at least one managed node capable of performing the physical layer measurement is determined.

To facilitate the understanding of the solution and benefits of the present disclosure, an example of the wireless short-distance communication system is described below.

For example, in the wireless short-distance communication system, the management node may be called G node, and the managed node may be called T node.

Low-power consumption communication technology has been introduced into the wireless short-distance communication system. In the wireless short-distance communication system based on the low-power consumption communication technology, after the G node instructs one or more T nodes to perform the physical layer measurement, the one or more T nodes insert the pilot symbol for the physical layer measurement into the physical layer data information of the wireless frame.

Figure 9:
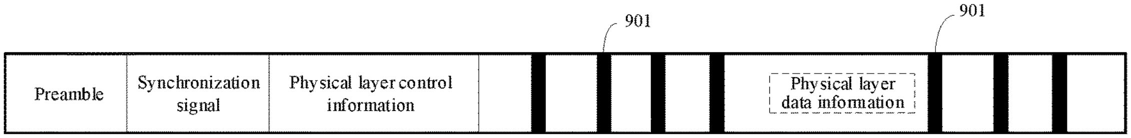
FIG. 9 is a schematic diagram of a wireless frame in an exemplary wireless short-distance communication system.

FIG. 9 is a schematic diagram of a wireless frame in an exemplary wireless short-distance communication system.

As shown in FIG. 9, the frame structure of the wireless frame includes a preamble, a synchronization signal, physical layer control information, and physical layer data information sequentially arranged. A plurality of pilot symbols 901 is included in the physical layer data information. The plurality of pilot symbols 901 is inserted into the physical layer data information at equal intervals in the time domain. An encoding process such as phase rotation is performed on the plurality of pilot symbols 901 together with data symbols in the physical layer data information. As shown in FIG. 9, one pilot symbol 901 is inserted every certain number of data symbols in the physical layer data information.

Specifically, an insertion interval at which the plurality of pilot symbols 901 is inserted into the physical layer data information is controlled by pilot density signaling and may be divided into three cases: 4:1, 8:1 and 16:1. 4:1 refers to inserting one pilot symbol 901 every four data symbols. 8:1 refers to inserting one pilot symbol every eight data symbols. 16:1 refers to inserting one pilot symbol every 16 data symbols.

As shown in FIG. 9, in the wireless short-distance communication system, the plurality of pilot symbols for the physical layer measurement is sent together with the data symbols. If there is no data interaction between device nodes of the wireless short-distance communication system, wireless frame transmission carrying data symbols will be absent. It is impossible to insert the plurality of pilot symbols into the wireless frame, and it is also impossible to perform the physical layer measurement.

Based on the above analysis, using the measurement request frame, the measurement frame, and corresponding signaling interaction mechanism for the physical layer measurement defined in the embodiments of the present disclosure effectively transmits the plurality of pilot symbols required for the physical layer measurement between the management node and the one or more managed nodes, and hence supports the physical layer measurement without the data interaction.

With reference to a scenario of the wireless short-distance communication system, a signaling interaction process of the measurement request frame and the wireless frame involved in the physical layer measurement is described in detail below.

Figure 10:
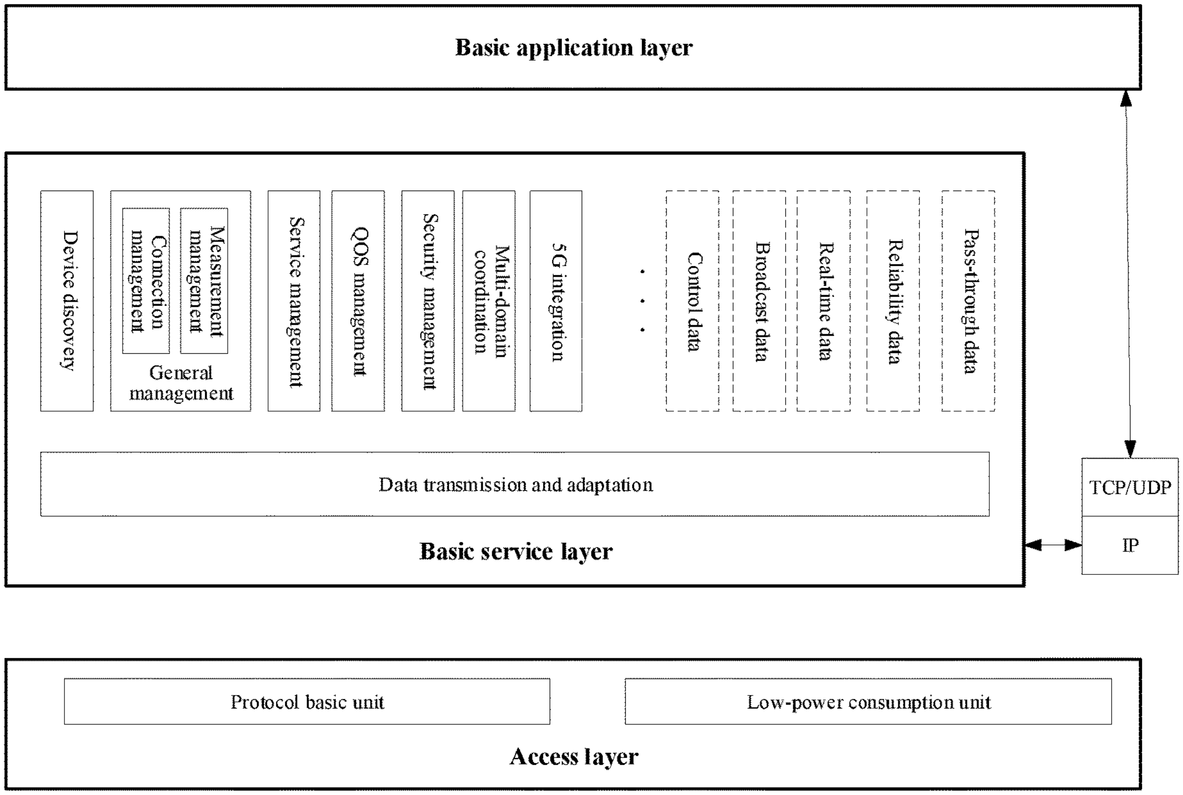
FIG. 10 is a schematic diagram of a protocol architecture in an exemplary wireless short-distance communication system according to some embodiments of the present disclosure.

FIG. 10 is a schematic diagram of a protocol architecture in an exemplary wireless short-distance communication system according to some embodiments of the present disclosure.

As shown in FIG. 10, the protocol architecture includes a basic application layer, a basic service layer, and an access layer from top to bottom.

The access layer includes a protocol basic unit and a low power consumption unit. The communication between the basic application layer and the basic service layer supports internet protocol (IP) and transmission control protocol (TCP) or user datagram protocol (UDP).

The basic service layer includes protocol functional units such as data transmission and adaptation, device discovery, and general management.

In the protocol framework of the wireless short-distance communication system, the measurement management unit is responsible for the measurement and status supervision of related performance parameters of the basic service layer and the access layer.

For the access layer, the measurement management unit may use cross-layer primitive calls to collect physical layer parameter information such as RSRP (Reference Signal Received Power), RSSI (Received Signal Strength Indication), RSRQ (Reference Signal Received Quality), SINR (Signal and Interference Add noise ratio), bit error rate, transceiver rate, AoA (angle of arrival), AoD (angle of departure), and ToF (time of flight).

For a transmission channel in a basic service layer flow mode or in a reliable mode, the measurement management unit supports the measurement of performance indicators such as end-to-end delay and jitter.

The cross-layer primitive calls include a physical layer parameter query request, a physical layer parameter report, a physical layer parameter query cancellation, and a physical layer parameter query cancellation confirmation.

Figure 11:
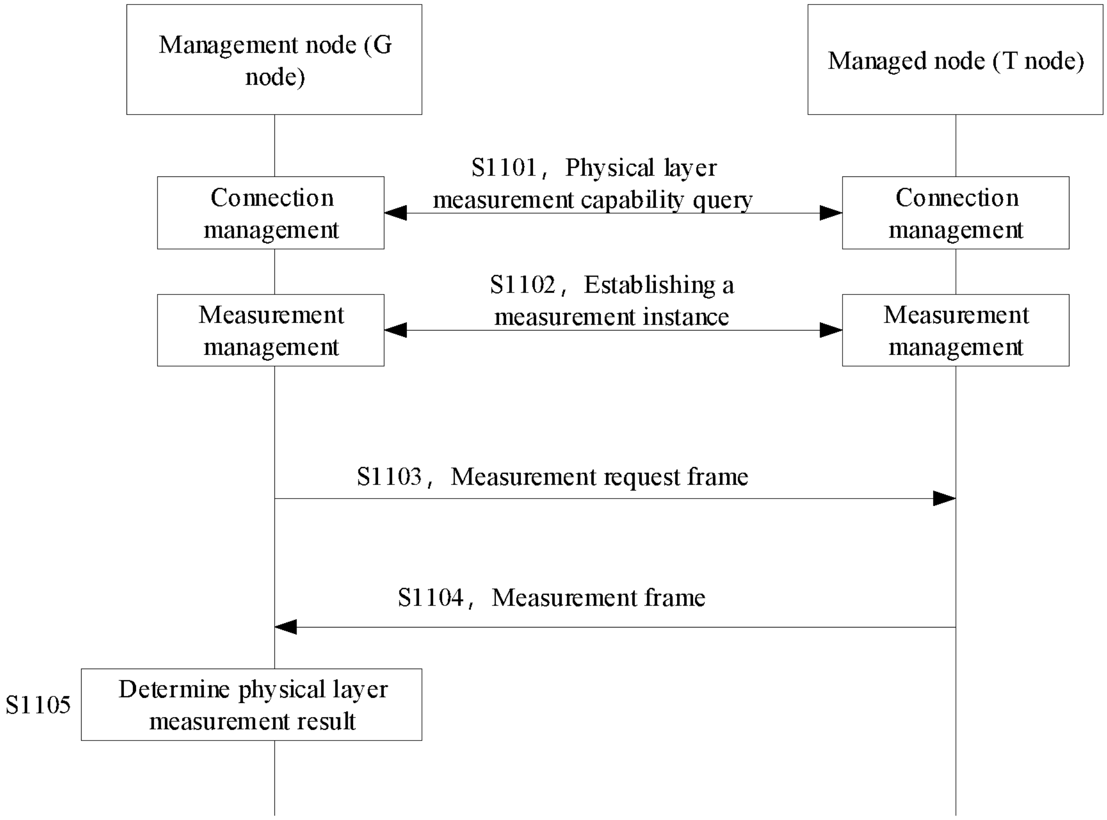
FIG. 11 is a flowchart of an exemplary method for physical layer measurement according to some embodiments of the present disclosure.

The embodiments of the present disclosure will be described below in combination with the protocol framework of the wireless short-distance communication system. FIG. 11 is a flowchart of an exemplary method for physical layer measurement according to some embodiments of the present disclosure. As shown in FIG. 11, the method includes obtaining the physical layer measurement data and sending the physical layer measurement data. The method includes the following processes.

At S1101, the management node queries whether each managed node is capable of performing a specified physical layer measurement, and obtains a query result from each managed node.

The query result indicates whether the managed node is capable of performing the physical layer measurement.

As shown in FIG. 11, through communication between the connection management functional unit at the management node and the connection management functional unit at the managed node in the protocol structure of the wireless short-distance communication system, the management node determines whether the managed node is capable of performing the specified physical layer measurements.

For example, if the management node needs to perform channel quality measurement, the management node needs to query whether the managed node has relevant capabilities such as sending the pilot symbol required for the channel quality measurement.

It should be understood that there are many specific implementation variations for the management node to query whether each managed node has the physical layer measurement capability. The present disclosure Is not limited thereto.

At S1102, the management node determines at least one target managed node for performing the physical layer measurement based on the query results of each managed node, and negotiates measurement information with the target managed node.

For example, the management node determines that the query results indicate that at least one managed node has the physical layer measurement capability, and based on the objective of the physical layer measurement, determines one or more target managed nodes from the determined at least one managed node.

The management node and the one or more target managed nodes may perform measurement information negotiation through the measurement management functional units in the protocol architecture. The measurement information negotiation is commonly known as determining a measurement instance and establishing a measurement instance. Each measurement instance corresponds to a specific measurement item of the physical layer measurement.

Some configuration information of the physical layer measurement may be determined through the measurement information negotiation, and may include some information in the physical layer measurement configuration information, such as the pilot symbol sending times, and the wireless channel codes, etc. The configuration information may also include other information such as the type of synchronous clock source and the measurement mode (one-way measurement or two-way measurement) in addition to the physical layer measurement configuration information. The present disclosure is not limited thereto.

After the measurement instance is established, the measurement request frame is triggered to be sent.

At S1103, the management node sends the measurement request frame.

The measurement request frame may include the physical layer measurement configuration information.

For example, the physical layer measurement configuration information may include a measurement request frame identifier used to instruct a target managed node to start sending a pilot symbol, a measurement request node identifier used to indicate the management node that sends the measurement request frame, a requested node identifier used to indicate the target managed node for sending the pilot symbol, a to-be-measured wireless channel code used to indicate a wireless channel that needs to be measured at the physical layer, and a pilot symbol format indicator used to indicate transmission format information of the pilot symbol.

The physical layer measurement configuration information may be included in the physical layer control information or the physical layer data information of the measurement request frame. Alternatively, the physical layer measurement configuration information may be partially included in the physical layer control information of the measurement request frame and partially included in the physical layer data information of the measurement request frame.

For the specific structure of the measurement request frame, reference can be made to the relevant previous descriptions, and the details thereof are omitted herein.

At S1104, the target managed node returns the measurement frame to the management node.

The measurement frame may include the pilot symbol for the physical layer measurement, and the pilot symbol may be included in the physical layer data information of the measurement frame.

At the same time, the physical layer control information of the measurement frame may include a measurement frame identifier, a requesting node identifier, a sending node identifier, and a pilot symbol format indicator, etc. For details, reference can be made to the relevant previous descriptions, and the details thereof are omitted herein.

At S1105, the management node determines the physical layer measurement result through the pilot symbol in the received measurement request frame.

It should be understood that the above description is based on the protocol architecture and the physical layer measurement process of the wireless short-distance communication system. But it is also applicable to wireless short-distance communication systems based on other protocol architectures. The present disclosure is not limited thereto.

Corresponding to the method for obtaining the physical layer measurement data, the present disclosure also provides an apparatus for obtaining the physical layer measurement data.

Figure 12:
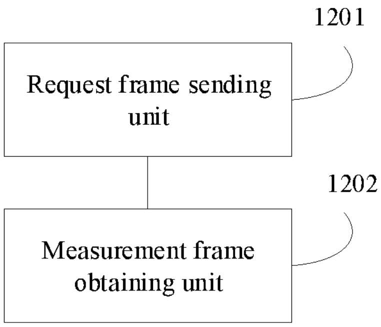
FIG. 12 is a schematic structural diagram of an exemplary apparatus for obtaining physical layer measurement data according to some embodiments of the present disclosure.

FIG. 12 is a schematic structural diagram of an exemplary apparatus for obtaining physical layer measurement data according to some embodiments of the present disclosure. The apparatus can be applied to a management node in a wireless short-distance communication system. As shown in FIG. 12, the apparatus includes a request frame sending unit 1201 configured to send the measurement request frame and a measurement frame obtaining unit 1202 configured to obtain a measurement frame returned by the target managed node. The measurement request frame includes the physical layer measurement configuration information. The physical layer measurement configuration information includes one or both of the physical layer control information and the physical layer data information in the measurement request frame. The physical layer measurement configuration information includes the identifier of at least one target managed node. The measurement frame includes the pilot symbol for physical layer measurement. The pilot symbol is included in the physical layer data information of the measurement frame.

In some embodiments, the frame structure of the measurement request frame sent by the request frame sending unit and the measurement frame obtained by the measurement frame obtaining unit both sequentially include: the preamble, the synchronization signal, the physical layer control information, and the physical layer data information.

In some other embodiments, the physical layer measurement configuration information in the measurement request frame sent by the request frame sending unit further includes the measurement request frame identifier used to instruct the target managed node to start sending the pilot symbol, the measurement request node identifier used to indicate the management node that sends the measurement request frame, the to-be-measured wireless channel code, and the pilot symbol format indicator used to indicate the transmission format information of the pilot symbol.

In some other embodiments, the request frame sending unit is specifically configured to send the measurement request frame in the form of unicast or multicast.

In some embodiments, when the request frame sending unit sends the measurement request frame in the form of multicast, the physical layer measurement configuration information in the measurement request frame sent by the request frame sending unit includes multiple target managed node identifiers. The pilot symbol format indicator in the physical layer measurement configuration information includes the pilot symbol sending times corresponding to the identifiers of the multiple target managed nodes.

In some other embodiments, the to-be-measured wireless channel codes in the physical layer measurement configuration information include the wireless channel codes corresponding to multiple to-be-measured frequency bands. The pilot symbol format indicator in the physical layer measurement configuration information includes the pilot symbol sending times at which the identifiers of each target managed node are respectively used to send the plurality of pilot symbols in the multiple frequency bands.

In some other embodiments, the physical layer control information of the measurement frame obtained by the measurement frame obtaining unit includes the measurement frame identifier used to instruct the management node to start receiving the pilot symbol, the measurement request node identifier used to indicate the management node requesting the pilot symbol, the sending node identifier used to indicate the target managed node sending the measurement frame, and the pilot symbol format indicator used to indicate the transmission format information of the pilot symbol.

Corresponding to the method for sending the physical layer measurement data, the present disclosure further provides an apparatus for sending the physical layer measurement data.

Figure 13:
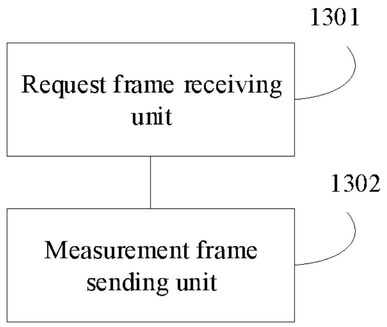
FIG. 13 is a schematic structural diagram of an exemplary apparatus for sending physical layer measurement data according to some embodiments of the present disclosure.

FIG. 13 is a schematic structural diagram of an exemplary apparatus for sending physical layer measurement data according to some embodiments of the present disclosure. The apparatus can be applied to a managed node in a wireless short-distance communication system. As shown in FIG. 13, the apparatus includes the request frame receiving unit 1301 configured to receive the measurement request frame and a measurement frame sending unit 1302 configured to send the measurement frame. The measurement request frame includes the physical layer measurement configuration information. The physical layer measurement configuration information includes one or both of the physical layer control information and the physical layer data information in the measurement request frame. The physical layer measurement configuration information includes the identifier of the managed node and the identifier of the measurement request node. The identifier of the measurement request node is used to indicate the management node that sends the measurement request frame. The measurement frame includes the pilot symbol for the physical layer measurement. The pilot symbol is included in the physical layer data information of the measurement frame. The physical layer control information of the measurement frame includes the measurement request node identifier. The measurement request node identifier is used to indicate the management node requesting the pilot symbol.

In some embodiments, the frame structure of the measurement request frame received by the request frame receiving unit and the measurement frame sent by the measurement frame sending unit both include the preamble, the synchronization signal, the physical layer control information, and the physical layer data information.

In some embodiments, the physical layer measurement configuration information in the measurement request frame received by the request frame receiving unit further includes the measurement request frame identifier used to instruct the target managed node to start sending the pilot symbol, the measurement request node identifier used to indicate the management node that sends the measurement request frame, the to-be-measured wireless channel codes, and the pilot symbol format indicator used to indicate the transmission format information of the pilot symbol.

In some embodiments, the physical layer control information of the measurement frame sent by the measurement frame sending unit includes the measurement frame identifier used to instruct the management node to start receiving the pilot symbol, the measurement request node identifier used to indicate the management node requesting the pilot symbol, the sending node identifier used to indicate the target managed node sending the measurement frame, and the pilot symbol format indicator used to indicate the transmission format information of the pilot symbol.

Figure 14:
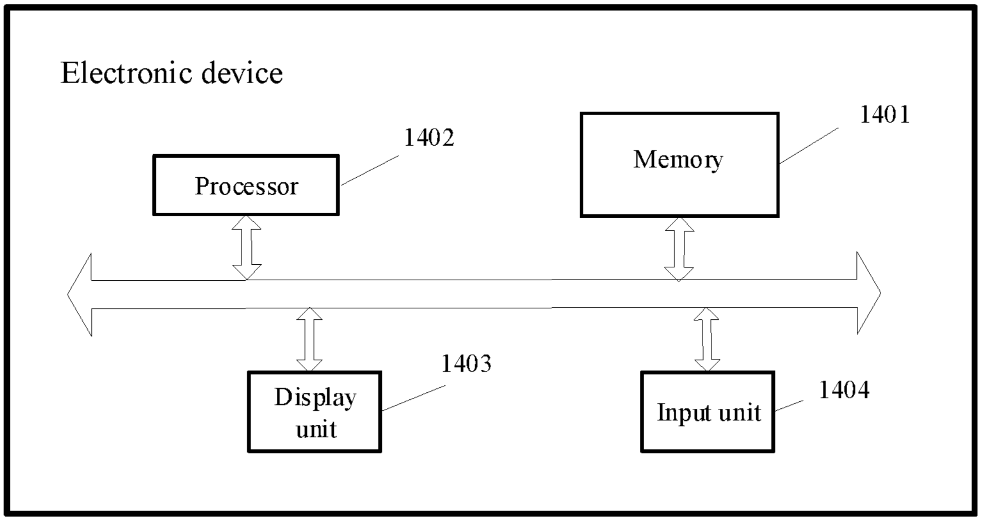
FIG. 14 is a schematic structural diagram of an exemplary electronic device according to some embodiments of the present disclosure.

The present disclosure also provides an electronic device. FIG. 14 is a schematic structural diagram of an exemplary electronic device according to some embodiments of the present disclosure. The electronic device may be a vehicle-mounted device, a mobile terminal, etc. As shown in FIG. 14, the electronic device includes at least a memory 1401 and a processor 1402. The processor 1401 is configured to execute the method for obtaining the physical layer measurement data or the method for sending the physical layer measurement data in any one of the above-described embodiments.

The memory 1402 is used to store programs necessary for the processor to perform operations.

It should be understood that the electronic device may further include a display unit 1403 and an input unit 1404.

Of course, the electronic device can also have more or fewer components than those shown in FIG. 14. The present disclosure is not limited thereto.

The present disclosure also provides a computer-readable storage medium. The computer-readable storage medium stores at least one instruction, at least one program, code set or instruction set. The at least one instruction, the at least one program, the code set or instruction set is loaded and executed by a processor to perform the method for obtaining the physical layer measurement data or the method for sending the physical layer measurement data in any one of the above-described embodiments.

The present disclosure also provides a computer program. The computer program includes computer instructions. The computer instructions are stored in a computer-readable storage medium. When the computer program runs on an electronic device, the computer program is used to perform the method for obtaining the physical layer measurement data or the method for sending the physical layer measurement data in any one of the above-described embodiments.

In the embodiments of the present disclosure, the measurement request frame sent by the management node in the wireless short-distance communication system includes the physical layer measurement configuration information. The physical layer measurement configuration information includes the identifier of the target managed node that needs to perform the physical layer measurement. Correspondingly, the target managed node may return a measurement frame to the management node, and the physical layer data information in the measurement frame includes the pilot symbol for the physical layer measurement. In some embodiments, the management node may instruct the target managed node to return the measurement frame carrying the pilot symbol through the measurement request frame, without resorting to the wireless frame used to transmit data between the physical layers. Thus, even if there is no data interaction between the management node and the managed nodes, and data for the physical layer measurement may also be obtained through the measurement request frame and the measurement frame.

It should be noted that each embodiment in this specification is described in a progressive manner, and each embodiment focuses on the differences from other embodiments. For the same and similar parts in each embodiment, reference can be made to each other. At the same time, the features described in various embodiments in this specification may be replaced or combined with each other, such that those skilled in the art can implement or use the present disclosure. As for the device-type embodiments, because they are basically similar to the method embodiments, the description thereof is relatively simple. For details of related parts, reference can be made to the description of the method embodiments.

Further, it should also be noted that in this specification, relational terms such as first and second etc. are only used to distinguish one entity or operation from another, and do not necessarily require or imply that any such actual relationship or order of these entities or operations exists. The terms "includes", "comprises" or any other variation thereof are intended to cover a non-exclusive inclusion such that a process, method, article, or apparatus comprising a set of elements includes not only those elements, but also includes elements not expressly listed. or also includes elements inherent in such a process, method, article, or apparatus. Without further limitations, an element defined by the phrase "comprising a . . . " does not preclude the presence of additional identical elements in the process, method, article, or apparatus that includes the element.

The above description of the disclosed embodiments is provided to enable those skilled in the art to make or use the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments shown herein, but is to be accorded the widest scope consistent with the principles and novel features disclosed herein.

What is claimed is:

1. A method for obtaining physical layer measurement data being applied to a management node in a wireless short-distance communication system, comprising:

sending, as a first physical layer frame, a measurement request frame including physical layer measurement configuration information, the first physical layer frame including first physical layer control information and first physical layer data information, the physical layer measurement configuration information being at least partially included in the first physical layer control information of the first physical layer frame, and the physical layer measurement configuration information including an identifier of at least one target managed node; and obtaining, as a second physical layer frame, a measurement frame returned by the at least one target managed node, the second physical layer frame including second physical layer data information, the measurement frame including a pilot symbol for physical layer measurement, the pilot symbol being included in the second physical layer data information of the second physical layer frame, and the second physical layer data information of the second physical layer frame not carrying a cyclic check bit.

2. The method according to claim 1, wherein:

the first physical layer frame includes a first preamble, a first synchronization signal, the first physical layer control information, and the first physical layer data information arranged sequentially; and the second physical layer frame includes a second preamble, a second synchronization signal, second physical layer control information, and the second physical layer data information arranged sequentially.

3. The method according to claim 2, wherein the second physical layer control information of the second physical layer frame includes:

a measurement frame identifier used to instruct the management node to start receiving the pilot symbol;

a measurement request node identifier used to indicate the management node requesting the pilot symbol;

a sending node identifier used to indicate the target managed node sending the measurement frame; and the pilot symbol format indicator used to indicate the transmission format information of the pilot symbol.

4. The method according to claim 1, wherein the physical layer measurement configuration information in the measurement request frame further includes:

a measurement request frame identifier used to instruct a target managed node to start sending the pilot symbol;

a measurement request node identifier used to indicate the management node that sends the measurement request frame;

a requested node identifier used to indicate the target managed node for sending the pilot symbol;

a to-be-measured wireless channel code used to indicate a wireless channel that needs to be measured at the physical layer; and a pilot symbol format indicator used to indicate transmission format information of the pilot symbol.

5. The method according to claim 4, wherein:

the to-be-measured wireless channel code in the physical layer measurement configuration information includes wireless channel codes corresponding to multiple to-be-measured frequency bands; and the pilot symbol format indicator in the physical layer measurement configuration information includes the pilot symbol sending times at which the identifiers of the multiple target managed nodes are respectively used to send a plurality of pilot symbols in the multiple to-be-measured frequency bands.

6. The method according to claim 4, wherein the transmission format information of the pilot symbol includes at least one of a sequence generation coefficient, a length of the pilot symbol, or a transmission power of the pilot symbol.

7. The method according to claim 1, wherein:

sending the measurement request frame includes sending the measurement request frame in a form of unicast or multicast.

8. The method according to claim 7, wherein:

when the measurement request frame is sent in the form of multicast, the physical layer measurement configuration information includes identifiers of multiple target managed nodes, and the pilot symbol format indicator in the physical layer measurement configuration information includes pilot symbol sending times corresponding to the identifiers of the multiple target managed nodes.

9. The method according to claim 1, wherein:

the management node queries whether each managed node is capable of performing the physical layer measurement, and obtains query results from each managed node.

10. The method according to claim 9, wherein:

the management node determines the at least one target managed node for performing the physical layer measurement based on the query results, and negotiates measurement information with the at least one target managed node.

11. A method for sending physical layer measurement data being applied to a managed node in a wireless short-distance communication system, comprising:

receiving, as a first physical layer frame, a measurement request frame including physical layer measurement configuration information, the first physical layer frame including first physical layer control information and first physical layer data information, the physical layer measurement configuration information being at least partially included in the first physical layer control information of the first physical layer frame, and the physical layer measurement configuration information including a managed node identifier and a measurement request node identifier used to indicate a management node that sends the measurement request frame; and sending, as a second physical layer frame, a measurement frame including a pilot symbol for physical layer measurement, the second physical layer frame including second physical layer data information, the pilot symbol being included in the second physical layer data information of the second physical layer frame, the second physical layer data information of the second physical layer frame not carrying a cyclic check bit, and the second physical layer control information of the measurement frame including the measurement request node identifier used to indicate the management node that requests for the pilot symbol.

12. The method according to claim 11, wherein:

in response to a pilot symbol sending time corresponding to the managed node identifier being included in a pilot symbol format indicator of the physical layer measurement configuration information of the measurement request frame, the managed node sends the measurement frame when its corresponding pilot symbol sending time is reached.

13. The method according to claim 11, wherein:

in response to the physical layer measurement configuration information in the measurement request frame including wireless channel codes corresponding to multiple to-be-measured frequency bands, and the pilot symbol format indicator including pilot symbol sending times in multiple frequency bands corresponding to respective managed nodes, for each frequency band in the multiple frequency bands, the managed node transmits the pilot symbol in the frequency band when the corresponding pilot symbol sending time is reached.

14. An apparatus for obtaining physical layer measurement data being applied to a management node in a wireless short-distance communication system, comprising:

a memory storing program instructions; and a processor configured to execute the program instructions to perform:

sending, as a first physical layer frame, a measurement request frame including physical layer measurement configuration information, the first physical layer frame including first physical layer control information and first physical layer data information, the physical layer measurement configuration information being at least partially included in the first physical layer control information of the first physical layer frame, and the physical layer measurement configuration information including an identifier of at least one target managed node; and obtaining, as a second physical layer frame, a measurement frame returned by the at least one target managed node, the second physical layer frame including second physical layer data information, the measurement frame including a pilot symbol for physical layer measurement, the pilot symbol being included in the second physical layer data information of the second physical layer frame, and the second physical layer data information of the second physical layer frame not carrying a cyclic check bit.

15. The apparatus according to claim 14, wherein:

the first physical layer frame includes a first preamble, a first synchronization signal, the first physical layer control information, and the first physical layer data information arranged sequentially; and the second physical layer frame includes a second preamble, a second synchronization signal, second physical layer control information, and the second physical layer data information arranged sequentially.

16. The apparatus according to claim 15, wherein the second physical layer control information of the second physical layer frame includes:

a measurement frame identifier used to instruct the management node to start receiving the pilot symbol;

a measurement request node identifier used to indicate the management node requesting the pilot symbol;

a sending node identifier used to indicate the target managed node sending the measurement frame; and the pilot symbol format indicator used to indicate the transmission format information of the pilot symbol.

17. The apparatus according to claim 14, wherein the physical layer measurement configuration information in the measurement request frame further includes:

a measurement request frame identifier used to instruct a target managed node to start sending the pilot symbol;

a measurement request node identifier used to indicate the management node that sends the measurement request frame;

a requested node identifier used to indicate the target managed node for sending the pilot symbol;

a to-be-measured wireless channel code used to indicate a wireless channel that needs to be measured at the physical layer; and a pilot symbol format indicator used to indicate transmission format information of the pilot symbol.

18. The apparatus according to claim 17, wherein:

the to-be-measured wireless channel code in the physical layer measurement configuration information includes wireless channel codes corresponding to multiple to-be-measured frequency bands; and the pilot symbol format indicator in the physical layer measurement configuration information includes the pilot symbol sending times at which the identifiers of the multiple target managed nodes are respectively used to send a plurality of pilot symbols in the multiple to-be-measured frequency bands.

19. The apparatus according to claim 14, wherein:

sending the measurement request frame includes sending the measurement request frame in a form of unicast or multicast.

20. The apparatus according to claim 19, wherein:

when the measurement request frame is sent in the form of multicast, the physical layer measurement configuration information includes identifiers of multiple target managed nodes, and the pilot symbol format indicator in the physical layer measurement configuration information includes pilot symbol sending times corresponding to the identifiers of the multiple target managed nodes.

* * * * *